United States Patent [19]
Yamanaka

[11] Patent Number: 6,163,513
[45] Date of Patent: Dec. 19, 2000

[54] TRACK SERVO CONTROL APPARATUS FOR OPTICAL DISK

[75] Inventor: Yutaka Yamanaka, Tokyo, Japan

[73] Assignee: NEC Corporation, Tokyo, Japan

[21] Appl. No.: 09/067,048

[22] Filed: Apr. 27, 1998

[30] Foreign Application Priority Data

Apr. 25, 1997 [JP] Japan .................................. 9-109194

[51] Int. Cl.⁷ .................................................. G11B 7/095
[52] U.S. Cl. ................................. 369/44.35; 369/44.29
[58] Field of Search ............................. 369/44.29, 44.35

[56] References Cited

U.S. PATENT DOCUMENTS

| | | | |
|---|---|---|---|
| 5,210,732 | 5/1993 | Suenaga et al. | 369/44.35 |
| 5,247,503 | 9/1993 | Nomiyama et al. | 369/44.35 |
| 5,768,228 | 6/1998 | Bates et al. | 369/44.29 |

FOREIGN PATENT DOCUMENTS

| | | |
|---|---|---|
| 58-166541 | 10/1983 | Japan . |
| 1-185843 | 7/1989 | Japan . |
| 2-152037 | 6/1990 | Japan . |
| 2-165431 | 6/1990 | Japan . |
| 3-25728 | 2/1991 | Japan . |
| 3-116544 | 5/1991 | Japan . |
| 3-127337 | 5/1991 | Japan . |
| 5-40945 | 2/1993 | Japan . |
| 8-77589 | 3/1996 | Japan . |
| 8-249678 | 9/1996 | Japan . |

*Primary Examiner*—Aristotelis M. Psitos
*Attorney, Agent, or Firm*—Ostrolenk, Faber, Gerb & Soffen, LLP

[57] ABSTRACT

In a track servo control apparatus for an optical disk, including an optical head for recording and reproducing information in a track of a rotating optical disk, a lens actuator is provided on the optical head for displacing a light spot in a direction traversing the track of the optical disk, and a positioner is associated with the optical head for displacing the optical head in a radial direction of the optical disk. The optical head generates a positional deviation signal indicative of a positional deviation between the light spot and the track, and in a track following control operation, the lens actuator is driven on the basis of a high frequency component of the positional deviation signal and the positioner is driven on the basis of a low frequency component of the positional deviation signal. A variable filter circuit receives the positional deviation signal to separate the positional deviation signal into the high frequency component and the low frequency component, and a frequency threshold of the variable filter circuit for separating the positional deviation signal into the high frequency component and the low frequency component can to be changed by an external signal.

13 Claims, 3 Drawing Sheets

TRACK SERVO CONTROL APPARATUS FOR OPTICAL DISK

BACKGROUND OF THE INVENTION

1. Field of the Invention

The present invention relates to a track servo control apparatus for an optical disk, and more specifically to an optical disk track servo control apparatus incorporated in an optical disk apparatus for a recordable optical disk, and for controlling a light spot to follow a track of the optical disk, by cooperation of a-lens actuator capable of slightly displacing the light spot in a direction traversing the track of the optical disk and a positioner capable of moving an optical head from one end to the other end of a radius of the optical disk.

2. Description of Related Art

In this technical field, JP-A-58-166541, JP-A-03-127337, JP-A-02-152035, JP-A-03-116544, JP-A-01-185843, JP-A-02-165431, JP-A-03-025728, JP-A-08-077589, JP-A-08-249678, and JP-A-05-040945 are known, the content of which are incorporated by reference in their entirety into this application (an English abstract of these Japanese patent application publications are available from the Japanese Patent Office and the content of these English abstracts are also incorporated by reference in their entirety into this application).

Referring to FIG. 1, there is shown a block diagram of one example of the prior art optical disk track servo control apparatus. A focusing lens 51 is located to oppose a face of an optical disk 10 having a spiral recording track, and projects light spot on the recording track and receives a light reflected from the optical disk. A lens actuator 52 rotates the focusing lens 51 along the optical disk face, for example, in the case of a rotating type, so as to slightly displace the focusing lens 51 and hence the light spot in a direction traversing the optical disk track. An optical head 53 is equipped with the focusing lens 51 and the lens actuator 52 mentioned above, records information into and reads out information from the track of the optical disk rotating at a substantially constant speed. This optical head 53 also detects a track error signal 20 (a position deviation signal indicating a deviation in position between the light spot and the track) on the basis of the reflected light returning to the lens 51 and in accordance with a conventional method known in the prior art. A positioner 54 moves the optical head 53 from one end to the other end of a radius of the optical disk, while maintaining the condition that the optical head 53 opposes to the optical disk face.

A servo signal processing circuit 55 receives the track error signal 20 from the optical head 53, and generates a corresponding servo control signal 20. A filter circuit 56 receives the servo control signal 20 from the servo signal processing circuit 55 and separates it into a high frequency component and a low frequency component divided with a predetermined frequency threshold value. On the basis of the high frequency component, the filter circuit 56 generates a control signal 24 for positioning the lens actuator 52 in an optimum position, and outputs the actuator control signal 24 to an actuator driving circuit 58. On the basis of the low frequency component, the filter circuit 56 generates another control signal 26 for positioning the positioner 54 in an optimum position, and outputs the positioner control signal 26 to a positioner driving circuit 57.

The positioner driving circuit 57 receives the positioner control signal 26 and supplies a driving current to a driving means (not shown) of the positioner 54. Here, the driving means of the positioner 54 is conventionally constituted of a voice coil motor (VCM). The actuator driving circuit 58 receives the actuator control signal 24 and supplies a driving current to a driving means (not shown) of the lens actuator 52.

Here, the frequency threshold value for separating the position deviation signal (track error signal) into the high frequency component and the low frequency component is fixed at a frequency which is conventionally set to be higher than a rotating frequency of a spindle of the optical disk. Therefore, as shown in FIG. 2A, in a low frequency band including the rotating frequency of the spindle of the optical disk, the track following control is mainly performed by the positioner 54, and in a high frequency band which does not include the rotating frequency of the spindle of the optical disk, the track following control is mainly performed by the lens actuator 52.

The driving means of the positioner 54 is conventionally constituted of the VCM as mentioned above. However, the VCM has various disadvantages. For example, the VCM needs large a magnet and coil, and is difficult to assemble. The efficiency of a magnetic circuit is low, and electric power consumption is large, so that heat is easily generated. Therefore, as the driving means for the positioner 54, it is desired to adopt a means for transferring the rotating force of a rotary motor by use of a gear mechanism.

However, since the gear mechanism inevitably involves friction, if the positioner 54 is frequently driven, its endurance becomes a problem. Therefore, it is desirable to lower the frequency threshold between the driving region of the positioner 54 and the driving region of the lens actuator 52 as shown in FIG. 2B in order to drop the frequency of the driving of the positioner 54 (the driving times of the positioner) thereby to ensure the endurance of the gear mechanism. However, if the frequency threshold is set lower than the rotating frequency of the spindle of the optical disk, the deviation in position caused by eccentricity of the optical disk must be followed by the lens actuator 52. In this case, from a condition shown in FIG. 3A to a condition shown in FIG. 3B, a deviation occurs in a positional relation between the reflected light from the optical disk and the focusing lens 51, so that there occurs various adverse influences in recording, including a change in the amount of light projected from the lens (since a light beam 51A has an intensity curve 51B having a peak on its center axis) and a deforming of the shape of the beam spot.

SUMMARY OF THE INVENTION

Accordingly, it is an object of the present invention to provide a track servo control apparatus for an optical disk which overcomes the above mentioned defect of the conventional one.

Another object of the present invention is to provide a track servo control apparatus for an optical disk which is capable of using a gear mechanism as the positioner driving means without lowering the recording/reproducing characteristics.

The above and other objects of the present invention are achieved in accordance with the present invention by a track servo control apparatus for an optical disk, comprising an optical head for recording and reproducing information in a track of a rotating optical disk, a lens actuator provided on the optical head for displacing a light spot in a direction traversing the track of the optical disk, a positioner associated with the optical head for displacing the optical head in a radial direction of the optical disk, the optical head generating a positional deviation signal indicative of a positional deviation between the light spot and the track, so that in a track following control operation, the lens actuator is driven on the basis of a high frequency component of the positional deviation signal and the positioner is driven on the basis of a low frequency component of the positional deviation signal, wherein there is provided a variable filter circuit receiving the positional deviation signal to separate the positional deviation signal into the high frequency component and the low frequency component, a frequency threshold of the variable filter circuit for separating the positional deviation signal into the high frequency component the frequency threshold and the low frequency component, being able to be changed by an external signal.

According to another aspect of the present invention, there is provided a track servo control apparatus for an optical disk, comprising an optical head for recording and reproducing information in a track of a rotating optical disk, a lens actuator provided on the optical head for displacing a light spot in a direction traversing the track of the optical disk, a positioner associated with the optical head for displacing the optical head in a radial direction of the optical disk, the optical head generating a positional deviation signal indicative of a positional deviation between the light spot and the track, so that in a track following control operation, the lens actuator is driven on the basis of the positional deviation signal and the positioner is driven on the basis of a low frequency component of a second signal directly or indirectly indicating the positional deviation between the light spot and the track, wherein there is provided a variable filter circuit receiving the second signal to output only the low frequency component of the second signal, a cut-off frequency of the variable filter circuit for outputting only the low frequency component of the second signal, the cut-off frequency being able to be changed by an external signal.

Specifically, the second signal can be the positional deviation signal, a driving signal for the lens actuator, or a lens positional deviation signal outputted from the lens actuator.

In one embodiment, the variable filter circuit is so configured that the frequency threshold or the cut-off frequency of the variable filter circuit is set to be high in a recording operation and low in a reproducing operation.

Preferably, the variable filter circuit is so configured that the frequency threshold or the cut-off frequency of the variable filter circuit in a recording operation is set to be higher than a rotation frequency of the optical disk, and the frequency threshold or the cut-off frequency of the variable filter circuit in a reproducing operation is set to be lower than the rotation frequency of the optical disk.

The track following control is performed by using the lens actuator and the positioner. When the track position deviation occurs, the track following control is performed by the positioner in a low frequency band and by the lens actuator in a high frequency band. In a conventional practice, the lens actuator is set to have servo characteristics of a wide band, and on the other hand, the positioner is set to have servo characteristics having a cut-off frequency in a low frequency band Therefore, the variable filter circuit can change the cut-off frequency in the positioner in accordance with the external signal in order to set which of the positioner and the lens actuator mainly performs the track following control. Thus, the frequency threshold for separating the high frequency component and the low frequency component is substantially determined by setting the cut-off frequency in the positioner.

The above and other objects, features and advantages of the present invention will be apparent from the following description of preferred embodiments of the invention with reference to the accompanying drawings.

DESCRIPTION OF THE PREFERRED EMBODIMENTS

Figure 4:
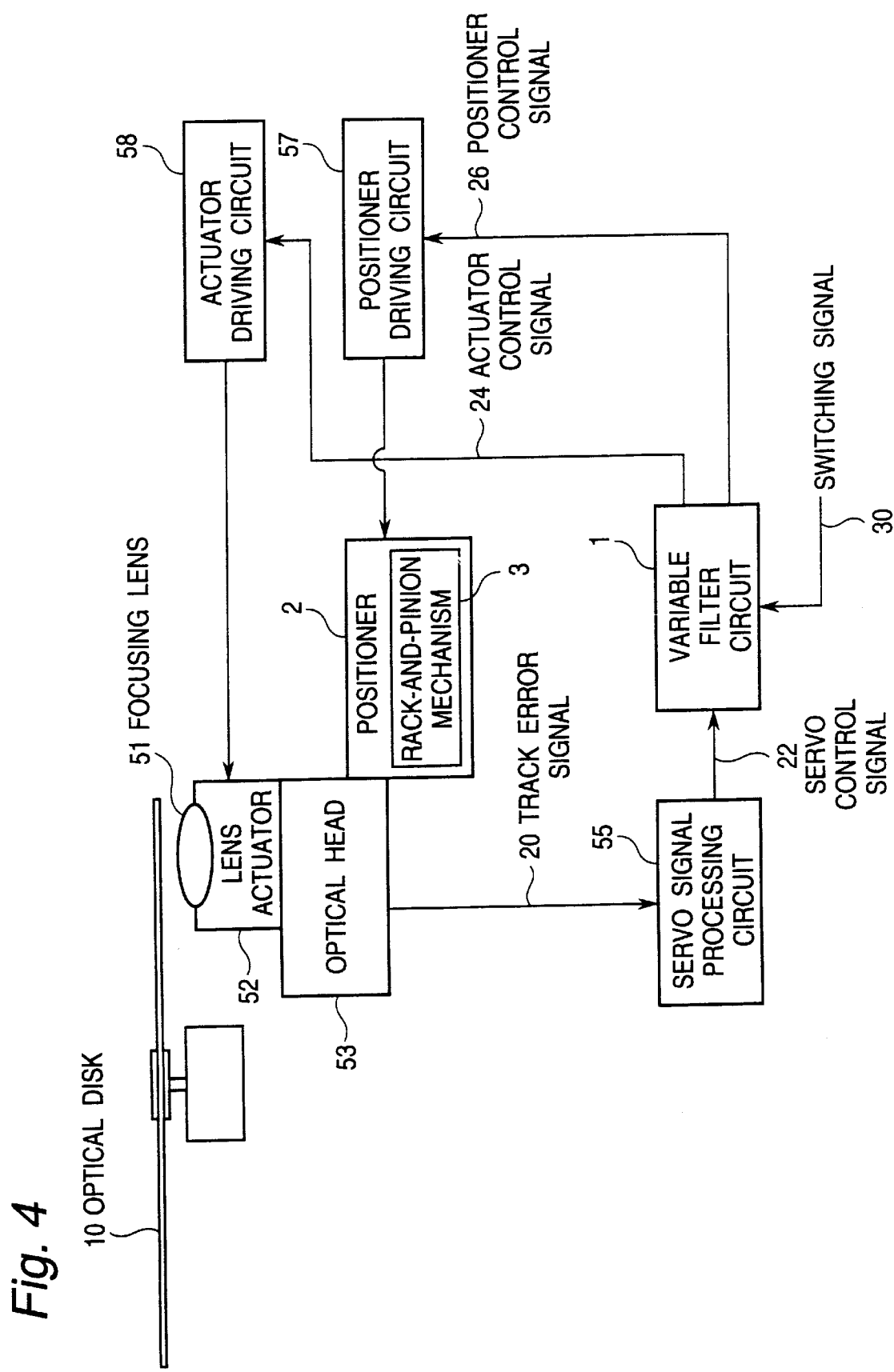
FIG. 4 is a block diagram of an embodiment of the optical disk track servo control apparatus in accordance with the present invention.

Now, an embodiment of the optical disk track servo control apparatus in accordance with the present invention will be described with reference to FIG. 4 and FIGS. 2A and 2B. In FIG. 4, elements similar to those shown in FIG. 1 are given the same reference numerals, and explanation thereof will be omitted for simplification of the description.

Figure 1:
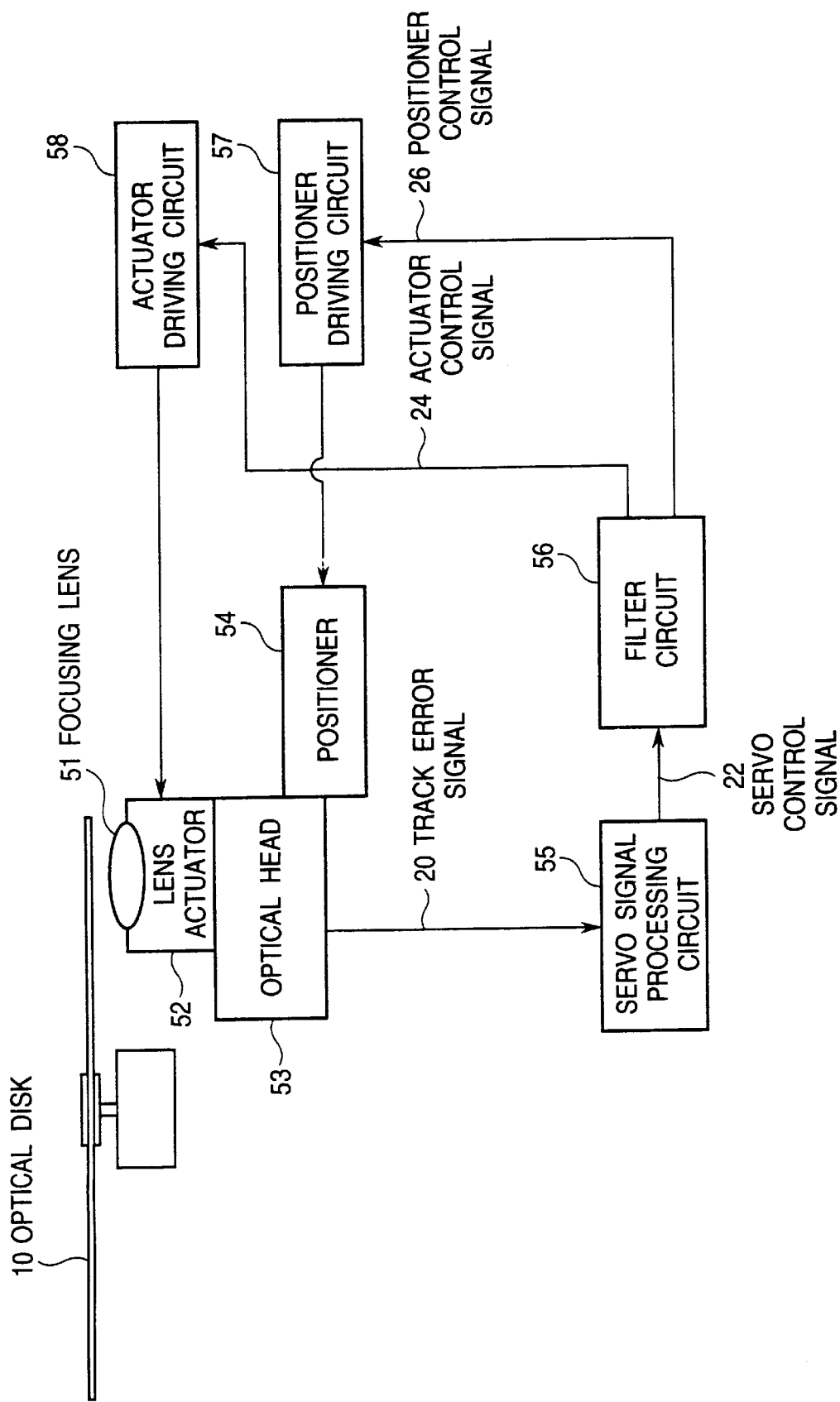
FIG. 1 is a block diagram of one example of the prior art optical disk track servo control apparatus.

As seen from comparison of FIG. 4 with FIG. 1, the embodiment of the optical disk track servo control apparatus in accordance with the present invention is the same as the prior art optical disk track servo control apparatus shown in FIG. 1, except that the positioner 54 is replaced with a positioner 2 including a rack-and-pinion mechanism 3 composed of a pinion (not shown) of a spur gear and a straight gear rack (not shown) in order to convert a rotating force of a rotary motor into a horizontal displacing force for the positioner, and the filter circuit 56 is replaced with a variable filter circuit I so configured that the frequency threshold can be changed in accordance with an external switching signal 30.

In this embodiment, the track following control is performed by using the lens actuator 52 and the positioner 2. When a track position deviation occurs, the track following control is performed by the positioner in a low frequency band and by the lens actuator in a high frequency band. Here, the lens actuator 52 is set to have servo characteristics of a wide band, and on the other hand, the positioner 1 is set to have servo characteristics having a cut-off frequency in a low frequency band. The variable filter circuit 1 changes the cut-off frequency in the positioner in accordance with the external switching signal in order to set which of the positioner and the lens actuator mainly performs the track following control. Thus, the frequency threshold for separating the high frequency component and the low frequency component is set by setting the cut-off frequency in accordance with the external switching signal 30. Here, the external switching signal 30 is a signal indicating which of a recording operation and a reproducing operation the device is in.

Figure 2A:
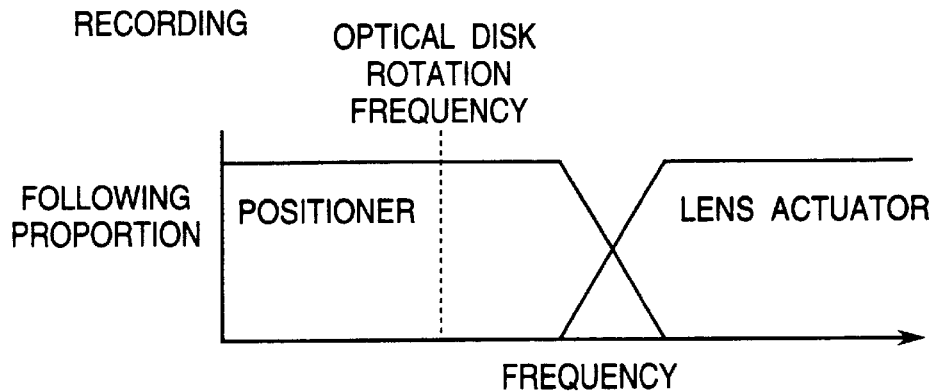
FIG. 2A illustrates a relation between the positioner and the lens actuator in a case in which the track following control is mainly performed by the positioner in a low frequency band including the rotating frequency of the spindle of the optical disk.
Figure 2B:
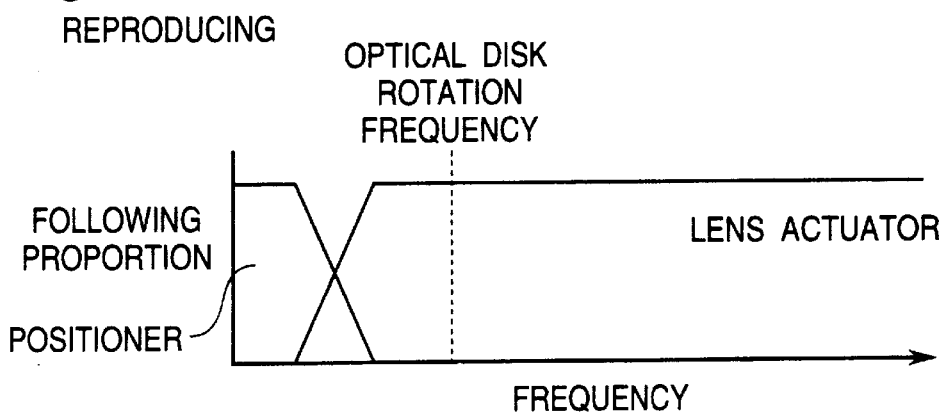
FIG. 2B illustrates a relation between the positioner and the lens actuator in a case in which the track following control is mainly performed by the lens actuator in a high frequency band including the rotating frequency of the spindle of the optical disk.
Figure 3A:
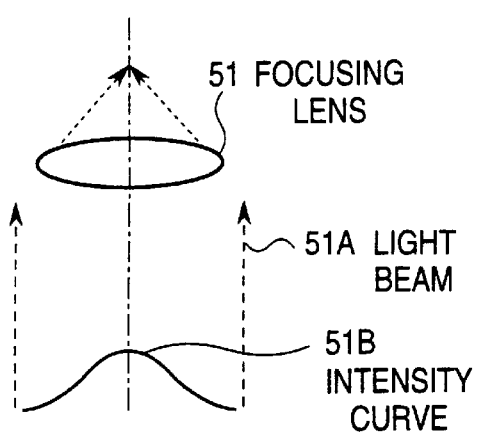
FIG. 3A illustrates a positional relation between the focusing lens and a light beam when the focusing lens is positioned on a neutral point.
Figure 3B:
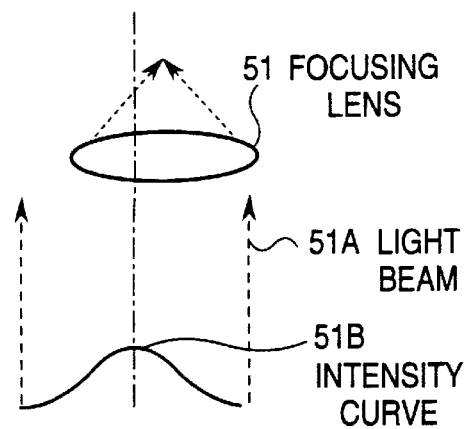
FIG. 3B illustrates a positional relation between the focusing lens and a light beam when the focusing lens is deviated from the neutral point.

FIGS. 2A and 2B illustrates which of the positioner and the lens actuator mainly performs the track following control. When the positioner, such as the gear mechanism, is used, friction is generated. If the endurance of the mechanism is considered, it is preferred to reduce the operating time or uptime of the positioner to the extent possible. In this embodiment, therefore, in a recording operation in which the allowable amount of displacement of the lens actuator 52 is small, the servo control region of the positioner 2 is set to be wide, while the displacement amount of the lens is reduced, as shown in FIG. 2A. On the other hand, in a reproducing operation in which the allowable amount of displacement of the lens actuator 52 is large, the servo control region of the positioner 2 is set to be narrow, as shown in FIG. 2B, so that the operating time or uptime of the positioner is reduced With this change of the operation region, both the endurance of the mechanism of the positioner and good recording/reproducing characteristics are made compatible.

The above mentioned advantage can be expected regardless of the value of the frequency threshold where the above mentioned switching is performed. For example, if the frequency threshold is switched between a value lower than the rotation frequency of the optical disk and a value higher than the rotation frequency of the optical disk as shown in FIGS. 2A and 2B, it is possible to switch which of the positioner and the lens actuator performs the track following control to cancel track deviations caused by eccentricity. Therefore, it is expected to effectively improve the endurance of the positioner.

The optical disk apparatus includes the type in which the optical disk rotating frequency is caused to change in accordance with a radial position, in connection with the format of the optical disk. In this case, since it can be deemed that the disk rotates at a constant speed just before and just after a specific radial position, it is possible to apply the track servo control apparatus having the above mentioned frequency threshold switching. In this case, if the track servo control apparatus is so configured to change the switching frequency in accordance with the optical disk rotating frequency, optimum positioner driving and a good recording and reproducing characteristics can be achieved for any format of the optical disk In the above mentioned embodiment, the frequency threshold is switched between the recording operation and the reproducing operation. However, the present invention is in no way limited to this embodiment. For example, it is possible to switch the frequency threshold in accordance with a type of optical disk. For example, for an optical disk having a low recording density and therefore having a large tolerance in the lens deviation, the positioner operating region is set to be narrow. On the other hand, for an optical disk having a high recording density and therefore having a small tolerance in the lens deviation, the positioner operating region is set to be wide.

The switching between the servo control frequency bands can be realized by an analog circuit, but if a digital circuit such as a digital signal processor (DSP) is used, it is possible to freely set the servo control frequency switching threshold by means of an operation using software.

In addition, in place of the track error signal outputted from the optical head, it is possible to use a lens position deviation detection signal outputted from the lens actuator or a driving signal (an actuator driving current) from an actuator driving circuit to the lens actuator, as the position deviation signal used for the positioner control. In the former case, the lens position deviation detection signal outputted from the lens actuator 52 is supplied to the servo signal processing circuit 55 and then to the variable filter circuit 1. In the latter case, the actuator driving current from the actuator driving circuit 58 to the lens actuator 51 is also supplied to the servo signal processing circuit 55 and then to the variable filter circuit 1. In these cases, an advantage similar to the above mentioned advantage can be obtained.

In the above mentioned embodiment, the positioner includes the rack-and-pinion mechanism. In this case, it would be a matter of course that the rack is fixed to the optical head, and the pinion mating with the rack is rotated by a rotary motor, which is controlled by the positioner driving circuit 57. In this connection, it is also a matter of course that the positioner can be alternatively constituted of a lead screw mechanism or a belt drive mechanism. In addition, it may also be possible to use the conventional VCM in the present invention as long as a reduction in power consumption is realized over that of the prior art.

As seen from the above, the present invention is characterized by provision of the variable filter circuit for changing the first region in which the track following control is mainly performed by the lens actuator and the second region in which the track following control is mainly performed by the positioner. Therefore, in the recording operation, the positioner operating region (second region) can be widened and the lens actuator operating region (first region) can be narrowed, and on the other hand, in the reproducing operation, the positioner operating region can be narrowed and the lens actuator operating region can be widened. Therefore, if the positioner mechanism is constructed of a mechanism involving friction, for example, a gear mechanism, both the endurance of the positioner and good recording/reproducing characteristics can be made compatible.

In addition, if the frequency threshold ill the recording operation is set lower than the rotation frequency of the optical disk and if the frequency threshold in the reproducing operation is set higher than the rotation frequency of the optical disk, it is possible to switch which of the positioner and the lens actuator performs the track following control to cancel track deviations caused by eccentricity. Therefore, it is expected to effectively improve the endurance of the positioner.

The invention has thus been shown and described with reference to specific embodiments. However, it should be noted that the present invention is in no way limited to the details of the illustrated structures but changes and modifications may be made within the scope of the appended claims.

What is claimed is:

1. A track servo control apparatus for an optical disk, comprising:

an optical head for recording and reproducing information in a track of a rotating optical disk;

a lens actuator provided on said optical head for displacing a light spot in a direction traversing said track of said optical disk;

a positioner associated with said optical head for displacing said optical head in a radial direction of said optical disk, said optical head generating a positional deviation signal indicative of a positional deviation between said light spot and said track, so that in a track following control operation, said lens actuator is driven on the basis of a high frequency component of said positional deviation signal and said positioner is driven on the basis of a low frequency component of said positional deviation signal; and a variable filter circuit for receiving said positional deviation signal to separate said positional deviation signal into said high frequency component and said low frequency component, said variable filter circuit having a frequency threshold for separating said positional deviation signal into said high frequency component and said low frequency component, wherein said frequency threshold can be changed by an external signal.

2. A track servo control apparatus as claimed in claim 1, wherein said variable filter circuit is so configured that said frequency threshold of said variable filter circuit is set to be high in a recording operation, and low in a reproducing operation.

3. A track servo control apparatus as claimed in claim 1, wherein said variable filter circuit is so configured that said frequency threshold of said variable filter circuit in a recording operation is set to be higher than a rotation frequency of said optical disk, and said frequency threshold of said variable filter circuit in a reproducing operation is set to be lower than said rotation frequency of said optical disk.

4. A track servo control apparatus for an optical disk, comprising:

an optical head for recording and reproducing information in a track of a rotating optical disk;

a lens actuator provided on said optical head for displacing a light spot in a direction traversing said track of said optical disk;

a positioner associated with said optical head for displacing said optical head in a radial direction of said optical disk, said optical head generating a positional deviation signal indicative of a positional deviation between said light spot and said track, so that in a track following control operation, said lens actuator is driven on the basis of said positional deviation signal and said positioner is driven on the basis of a low frequency component of a second signal directly or indirectly indicating said positional deviation between said light spot and said track; and a variable filter circuit for receiving said second signal to output only said low frequency component of said second signal, said variable filter circuit having a cut-off frequency for outputting only said low frequency component of said second signal, wherein said cut-off frequency can be changed by an external signal.

5. A track servo control apparatus as claimed in claim 4, wherein said second signal is said positional deviation signal.

6. A track servo control apparatus as claimed in claim 5, wherein said variable filter circuit is so configured that said cut-off frequency of said variable filter circuit is set to be high in a recording operation and low in a reproducing operation.

7. A track servo control apparatus as claimed in claim 5, wherein said variable filter circuit is so configured that said cut-off frequency of said variable filter circuit in a recording operation is set to be higher than a rotation frequency of said optical disk, and said cut-off frequency of said variable filter circuit in a reproducing operation is set to be lower than said rotation frequency of said optical disk.

8. A track servo control apparatus as claimed in claim 4, wherein said second signal is a driving signal for said lens actuator.

9. A track servo control apparatus as claimed in claim 8, wherein said variable filter circuit is so configured that said cut-off frequency of said variable filter circuit is set to be high in a recording operation and low in a reproducing operation.

10. A track servo control apparatus as claimed in claim 8, wherein said variable filter circuit is so configured that said cut-off frequency of said variable filter circuit in a recording operation is set to be higher than a rotation frequency of said optical disk, and said cut-off frequency of said variable filter circuit in a reproducing operation is set to be lower than said rotation frequency of said optical disk.

11. A track servo control apparatus as claimed in claim 4, wherein said second signal is a lens positional deviation signal outputted from said lens actuator.

12. A track servo control apparatus as claimed in claim 11, wherein said variable filter circuit is so configured that said cut-off frequency of said variable filter circuit is set to be high in a recording operation and low in a reproducing operation.

13. A track servo control apparatus as claimed in claim 11, wherein said variable filter circuit is so configured that said cut-off frequency of said variable filter circuit in a recording operation is set to be higher than a rotation frequency of said optical disk, and said cut-off frequency of said variable filter circuit in a reproducing operation is set to be lower than said rotation frequency of said optical disk.

* * * * *